Patented Apr. 16, 1929.

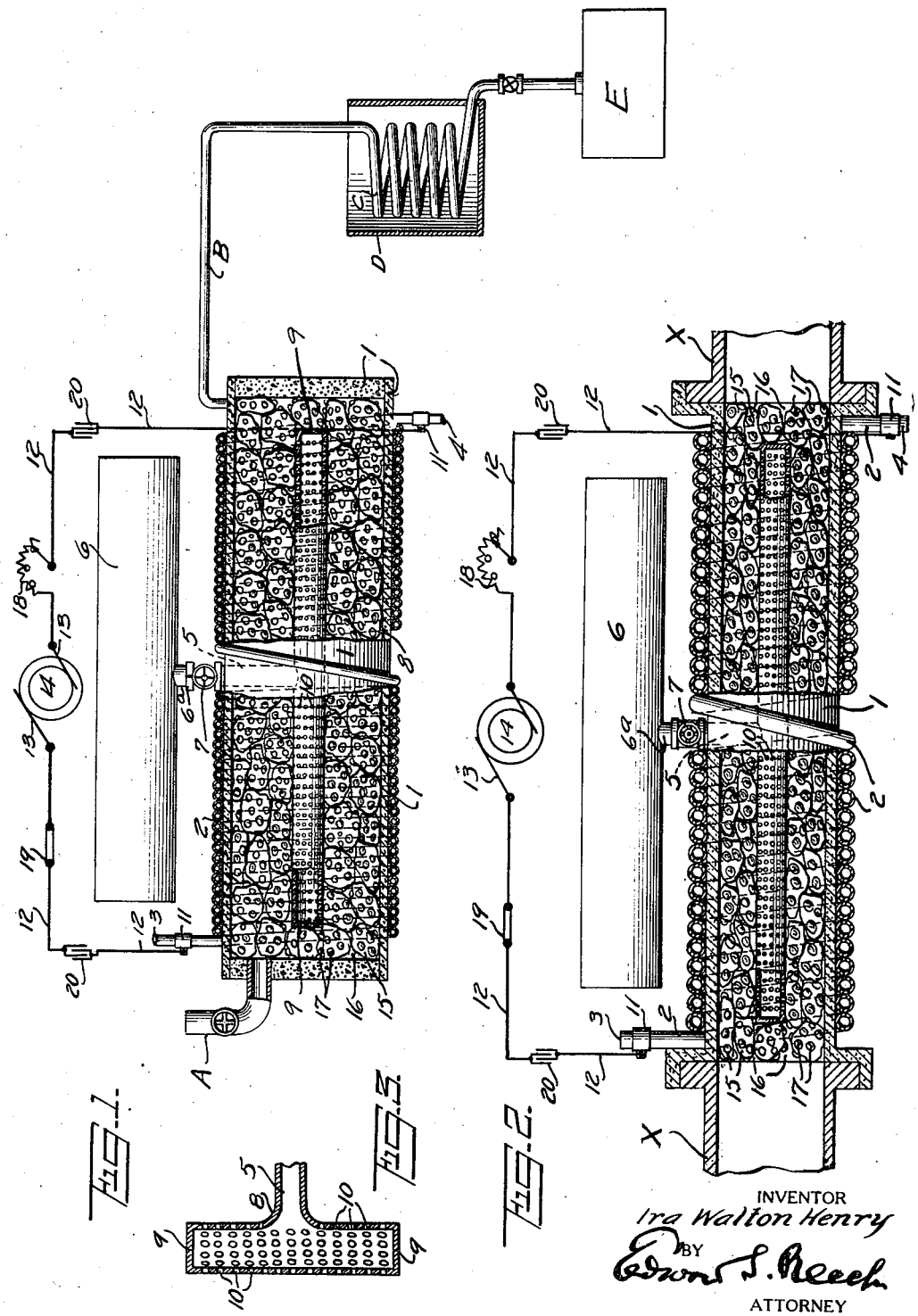

1,709,813

UNITED STATES PATENT OFFICE.

IRA WALTON HENRY, OF GREENWICH, CONNECTICUT, ASSIGNOR TO IONIZING CORPORATION OF AMERICA, OF NEW YORK, N. Y., A CORPORATION OF NEW YORK.

APPARATUS FOR IONIZATION AND CATALYTIC TREATMENT OF MATTER.

Application filed January 15, 1927. Serial No. 161,280.

This invention relates to apparatus for ionization and catalytic treatment of matter.

One of the objects of the present invention is to provide for the present purpose, and for every use to which it can be practically put, an ionizing and catalyzing apparatus of the general character herein shown.

Referring to the use of this apparatus for distillation or cracking of carbon-containing material, it is noted that crude petroleum oil frequently contains more carbon molecules than combine with hydrogen naturally in the oil, forming an excess of carbon that accumulates in the distilling or cracking stills. This excess carbon has to be removed from time to time, at considerable expense, and the work of removing the excess carbon commonly necessitates closing down the still or stills to be cleaned out. It has been proposed to provide stills with mechanical apparatus for removing the excess carbon. Stills have heretofore been provided with means for introducing hydrogen gas into them, in association with the oil to be cracked; and in some stills for distilling or cracking crude petroleum, or the like, the oil has been heated electrically.

One difficulty, heretofore encountered, has been the failure to heat the oil uniformly in the still, the interior portion of the oil being considerably cooler than its peripheral portion. Lack of uniformity of heat throughout the entire volume of the oil in a still retards distilling or cracking operations.

One use of the present apparatus is for utilization of said excess carbon as a constitutent of the refined oil product; avoidance of waste of such excess carbon, and of residual, heavy carbon oils; enrichment of the refined product by the retention in the refined oil product of carbon heretofore wasted, when not in combination with sufficient hydrogen; injection of atomized hydrogen gas from an extraneous source into the oil when the oil is in a high frequency, oscillating, non-discharging, non-sparking, hot, magnetic field, for more efficient and instantaneous union of the atoms of atomizedly injected hydrogen from an extraneous source, with carbon ions in such field. Such combination of carbon ions with hydrogen atoms is made enormously more energetic by passing the hydrogen, in contact with a heated, metallic catalyzing agent, into the oil in said field. Other uses of said aparatus are for avoidance of the delays and expense, heretofore encountered, in the removal of the excess carbon or waste carbon; and for heating the oil in the still uniformly.

The oil or other material to be treated is introduced into a receiver, by which term is intended either a conduit or any other form of a device for receiving any matter to be treated, for any and every purpose for which the apparatus is practically useful.

In the accompanying drawings forming a part hereof and illustrating the invention:

Fig. 1 shows a vertical, central, lengthwise section of one form of said receiver having closed ends in operative connection with connected electric and other apparatus, partly illustrated diagrammatically.

Fig. 2 is a view corresponding to Fig. 1, except that the receiver is a conduit shown interposed between communicating pipe sections.

Fig. 3 is a central, axial elevation of the nickel atomizer removed.

In the drawings, the crude oil or other material to be treated is introduced into a receiver 1 having an intake A, and, leading from its upper side, a conduit B for the product of treatment, the conduit B being shown coiled into a condenser worm C located in a cooling tank D. The condenser worm discharges into a tank E.

Describing the apparatus in connection with the cracking of oil, as one example of matter to be treated, so far as the present invention is concerned, the receiver may be one for treating material either under pressure or in vacuo. It may also be inclined or horizontal instead of vertical, if so desired.

Having thus set forth enough of the prior art to indicate how two out of many forms of receivers may be arranged for embodiment of the present invention, the construction and operation of the present invention will now be set forth.

In accordance with this invention, the oil receiver 1 is made of suitable, non-magnetic material; such for examples, as baked clay, as used in drain pipes; pyrex, quartz, or the like. A hollow copper tube 2 is wound closely in elongated coil form around the non-magnetic receiver 1, between its ends; whereby the coil encloses a portion of the chamber of the receiver. The copper tubular coil performs three functions, in that it re-enforces the wall of the non-magnetic receiver, while the copper itself serves as an electric conductor for an electric, high frequency, oscillating current, which current is productive of a high frequency, oscillating, non-discharging, non-sparking, electro-magnetic field within and along the length of the receiver chamber, corresponding to the length of the coil. The chamber of the coiled tube permits water or other cooling medium to be passed through the coil for reduction of the temperature of the metal, itself, in order to prevent its becoming melted by the electric current and also to keep the exterior walls of the coil in a cool, convenient and safe condition. The cooling medium flows into the upper end 3 of the coil and out of its under end 4.

Any electric current conducting material placed in the high frequency, oscillating, electro-magnetic field becomes a short-circuited secondary. Thus, the carbon in the oil, the nickle or other metallic catalyzing agent, the refractory graphite or carbon blocks or pieces 15 are all electric current conductors of varying degrees of efficiency as such conductors; but each one may constitute in said electro-magnetic field a short-circuited secondary which, due to its conductivity of and resistance to the electric current, produces heat in said field wherein the carbon particles expand and are disintegrated, as herein stated, into ions having affinity for hydrogen atoms.

There is, of course, no heat generated in said electro-magnetic field, when and if there is not present in said field some electric current conducting material which may be carbon or graphite, for example. If, then, in any suitable non-magnetic receiver enclosed by and connected with apparatus for establishing within the chamber of the receiver, said electro-magnetic field, suitable electric current conducting material is placed, the apparatus by induction becomes a form of electric heating apparatus. Said refractory material is a practically permanent element of the electro-mechanical combination embodied in my new apparatus.

Said receiver is provided with an opening through its wall, between its ends, for the introduction of a gas-tightly fitted pipe 5 for discharging, into the chamber of the receiver, hydrogen gas or any fluid or liquid desired, from a suitable extraneous supply source, indicated as a tank 6 provided with an outlet pipe 6ª having a regulating valve 7.

The inner end of the pipe 5, within the tank, is provided with a tubular cross head 8 having end walls 9. The cross head preferably extends nearly through the length of the electro-magnetic field, and spaced apart from the chamber walls, as shown. The circular walls of the tubular cross head are provided with numerous perforations 10 which are preferably about one one-hundredth of an inch in diameter and spaced apart at intervals of about one-eighth of an inch.

Preferably, the pipe 5 and its tubular cross head 8 are made integral and of the metal, nickel which itself is a durable catalytic agent. The hydrogen gas or other fluid or liquid in tank 6, will be under pressure, and is assumed to be compressed in the tank 6. If not compressed, it should be under head in order to flow by gravity into the receiver. Consequently, the material supplied to the receiver 1, within which the heated catalytic cross head is contained, is multitudinously and atomizedly jetted into the receiver 1; or, more specifically, is atomizedly discharged into said electromagnetic field wherein material to be treated is ionized or broken up into atoms, molecules, electrons or irons, although the precise nature thereof is a matter of scientific debate; and such atoms of carbon, in the oil, or of other ionizable material to be treated, automatically unite with atoms in the liquid or fluid introduced from the extraneous source. In the case of carbon containing oils, tars and the like, two atoms of hydrogen automatically combine with one atom of carbon. In some uses, the result of the simultaneous ionization and catalysis, may be a mixture rather than a chemical combination.

Particles in the oil, or other ionizable material, are acted upon by the high frequency, oscillation of the electromagnetic field and distintegrated into ions, at the same time becoming highly heated and expanded and thus giving an intensified affinity for other atoms, in the material from the extraneous source, with which they come in contact.

In said hot, electro-magnetic field, the oil, if that be the material under treatment, is in both a liquid and a vapor state and the simultaneous ionization and catalytic hydrogenation effects are alike in respect to both the liquid and vapor state. By the herein described treatment practically all carbon in oil, tars, or their gaseous vapors is utilized in the gaseous vapor product that is thereafter condensed.

According to the energy of the electric current which results in the establishment of said electro-magnetic field, the receiver 1, together with the metallic catalyzer for the hydrogen gas, or other material from the extraneous source, may be heated either to a low, an intermediate or a high temperature. In fact, if it is desired, the metal catalyzer may be raised to a glowing temperature; and I have found that a temperature varying from 700° Fah. to 1200° Fah. greatly intensifies the catalytic action of the nickel on the hydrogen gas when it is atomizedly injected into the oil in said electro-magnetic field. A similar intensification of catalysis is assumed to occur when catalyzable material other than hydrogen gas is employed in connection with any ionizable material.

Each end portion of the copper, coiled tube is electrically connected at 11 with an electric conductor 12 leading to a brush 13 of a high frequency, oscillating, alternating current generator or dynamo 14.

Within said receiver 1, and approximately filling it, are good sized chunks of electric current conducting, heatable non-floatable, contacting, non-metallic material, piled loosely in place, the heat in which serves to heat the oil, or other material around and above it, uniformly through its volume or mass, when and if the atomizable material is other than carbonaceous material. Both chemical combination, and mere mechanical mixture, of the ionized atoms or ions and of the catalyzed atoms from the extraneous material are best effected in the presence of heat uniformly extending throughout the volume or mass to be either chemically combined or mechanically mixed together. Although the receiver is approximately filled, throughout its length and cross-sectionally, with the chunks 15, there are spaces 16 between the chunks that permit the passing or free movement of the oil or its gaseous vapors, or other fluid or liquid material through the spaces 16. These chunks 15 are irregular in form and are not piled closely, but loosely, together in the chamber of the receiver, and like the receiver itself, are enclosed by the coil and are therefore each within said hot electro-magnetic field. While the material of chunks 15 may be lumps or chunks of graphite, carbon, gas house coke or other suitable material, such heatable material is preferably made up of a mixture of chunks and nickel shot 17 which are exposed on the surface and in the walls of the pits or recesses of the chunks. Graphite is a refractory, heatable material that may become extremely hot and which, when once heated will hold its heat. It may be made red hot. The nickel shot are catalytic agents. The nickel becomes also extremely hot and may become red hot; and, when thus heated, becomes a highly heated catalytic agent, which very greatly intensifies the molecular or atomic combination of atoms in the injected atomized hydrogen gas, or other fluid, with the carbon, or other, ions. The refractory material is piled around and encloses the catalytic cross head.

In the case of carbonaceous oil or its vapor, the oil or vapor under the influence of said electro-magnetic field is subject to destructive distillation during which practically all the carbon is effectively utilized.

The alternating current from the generator or dynamo is regulable by a rheostat 18 in a conductor 12. One of the conductors 12 is provided with a switch 19 and each includes a condenser 20.

The receiver being of clay or other comparatively frangible material, is beneficially re-enforced by the copper, coiled tube which is closely wound around it.

In Fig. 2, the ionizing and catalyzing apparatus is shown located between pipe sections X, the container permitting flow of fluid from one pipe section, through it and into the other pipe section. In some cases, the conduit form of apparatus may be used as a gas appliance for enrichment of fuel gas, or for fixation of commingled gases in a pipe section, when such commingled gases require to be heated to convert them into a fixed gas. The Fig. 1 form of my new apparatus is useful for the described treatment of flowing currents of a fluid or liquid to be treated. The Fig. 1 form of apparatus is adapted for similar treatment of fluids or liquids requiring treatment in a receiver through which they do not flow.

The refractory material such as graphite or carbon is distributed throughout said electro-magnetic field, and consequently throughout the volume of oil or the like in said field. This refractory material is a conductor of the electric current and serves, when heated, not only to maintain the temperature of the oil, at any desired degree depending on regulation of said oscillating current, but also to heat the nickel shot or other catalytic pieces exposed in, or on, or between, the refractory material distributed throughout said field. It is not necessary that the nickel shot or pieces be contained in the refractory material itself for the nickel pieces may be interspersed between chunks or pieces of the refractory material.

By ionization of carbon atoms as herein referred to, is broadly meant not only the electrolytic decomposition of the carbon molecules, particles or atoms effected by the intense heat and decomposing effect of the oscillating, electro-magnetic field but also the travel of the atoms or groups of atoms at an enormously high rate of speed, all resulting in intensive hydrogenation of the carbon ions.

In practice, I operate the apparatus with a high frequency current having a frequency of from ten thousand to twenty-five thousand cycles per second, the rate of frequency depending on the character of the petroleum oil or vapor to be treated and the character of the distillate required. By regulation of the frequency the characteristics of the distillate may be varied from those of a light gasoline oil, progressively to those of heavier oils, such as benzol, kerosene, so-called burning oils for furnaces, light and heavier lubricating oils and the heavier cylinder oils. All these I have obtained by the present invention by varying the frequencies and making hydrometer tests of the distillate at different periods of the density of the distillate. The chunks referred to serve as short-circuited secondaries and I have found in actual practice that the electric current passes through the chunks at their points of contact, raising the chunks to a high temperature whereby the oil and vapor treated are uniformly heated throughout their volume, the oily films formed between said points of contact being insufficient to insulate electrically one chunk from another. If the current is shut off for any reason, or if in a series of the apparatus it becomes necessary to discontinue the current from one or more of the series of apparatus for repairs or otherwise, the heated chunks retain the high heat for a considerable period so that the apparatus does not have to be warmed up initially.

What I claim is:

1. For ionizing and heating ionizable and heatable material, the herein described apparatus comprising a non-magnetic receiver for the material to be ionized and heated; a coil enclosing the receiver for conducting a high frequency, alternating electric current for establishment, within the chamber of the receiver, of a high frequency, oscillating, non-discharging, non-sparking, electro-magnetic field; and located within said chamber and field, partially spaced apart throughout the extent of said field, electric current conducting, stationary, heatable, non-floatable, non-metallic chunks having inter-spaces for flow of the material to be treated, said chunks being held permanently in place by the receiver walls, and said chunks being closely packed in electric current conducting contact one with another within the chamber of the receiver; said chunks forming a stationary, heatable mass for uniformly heating the material to be treated and for retaining heat for a substantial length of time, when and if said electric current becomes discontinued.

2. For ionizing, heating and catalyzing ionizable, heatable, catalyzable material, the herein described apparatus comprising a non-magnetic receiver for material to be ionized, heated and catalyzed; a coil enclosing the receiver for conducting a high frequency, alternating electric current for establishment within the chamber of the receiver of a high frequency, oscillating, non-discharging, non-sparking electro-magnetic field; and, located within said chamber and field, partially spaced apart throughout the extent of said field, electric current conducting, stationary, heatable, non-floatable, non-metallic chunks having inter-spaces for flow of fluid to be treated, said chunks being held permanently in place by the receiver walls, and said chunks being closely packed within the chambers of the receiver; and a multiplicity of pieces of catalytic metal, mechanically supported in place in said field, and said chunks forming therein a stationary mass for uniformly heating the material to be treated, said mass holding heat for a substantial length of time, when and if said current is discontinued.

3. The combination with a receiver and means for establishing and maintaining, within and adjacent the receiver chamber, a high frequency, electromagnetic field; of electric current conducting, stationary material within said chamber; said stationary material being provided with interspaces for flow of matter treated, including gaseous vapors generated therefrom; said stationary material being heatable by induction from said electromagnetic field and effective for uniformly heating the matter treated and gaseous vapor therefrom.

4. The combination with a receiver and means for establishing and maintaining, within and adjacent the receiver chamber, a high frequency, electromagnetic field; of electric current conducting, stationary material within said chamber; said stationary material being provided with interspaces for flow of matter treated, including gaseous vapors generated therefrom; said stationary material being heatable by induction from said electromagnetic field and effective for uniformly heating the matter treated and gaseous vapor therefrom; and means effective to supply said chamber with hydrogen.

Signed at New York city in the county of New York and State of New York, this tenth day of January, A. D. 1927.

IRA WALTON HENRY.